July 8, 1969 T. I. SORENSON 3,453,977
FERTILIZER ATTACHMENT FOR GRAIN SEEDERS
Filed March 9, 1967 Sheet 1 of 5

INVENTOR
Theodore I. Sorenson

ATTORNEY

FIG. II.

INVENTOR
Theodore I. Sorenson

INVENTOR
Theodore I. Sorenson

BY
ATTORNEYS

United States Patent Office 3,453,977
Patented July 8, 1969

3,453,977
FERTILIZER ATTACHMENT FOR GRAIN SEEDERS
Theodore I. Sorenson, Dutton, Mont. 59433
Filed Mar. 9, 1967, Ser. No. 621,915
Int. Cl. A01c 7/06
U.S. Cl. 111—36                                9 Claims

ABSTRACT OF THE DISCLOSURE

A fertilizer attachment for grain seeders in which the box has a series of discharge spouts into which fertilizer is fed by opposed rotary conveyor flights at opposite sides of each spout, cooperating with rotary impellers opposite each spout, baffles being provided within the box hinged to one side of the box and their lower ends resting on an angle bar rotatably covering and journaled on the shaft of the flights to keep the weight of the fertilizer in the box from resting directly on the flights and angle bar while permitting adjustment of the baffles and angle bar for handling different kinds of fertilizer, also giving uniform dispensing feed, and eliminating compaction of fertilizer in the box; also means for rotating the flights proportionally to the movement of the seeder over the ground, and means for varying the speed of rotation of the flights while the seeder is in motion.

DESCRIPTION OF DISCLOSURE

This invention is a novel fertilizer attachment which can be fitted on any type of grain seeder and is designed to give uniform fertilizer dispensing feed, to eliminate compaction of such fertilizer and to afford ease of operation. One object of the invention is to provide an attachment for the above type designed with a unique variable speed that is either electrically or hydraulically controlled, and which always conforms with the ground speed of the implement to which it is attached. From a control mounted on the towing tractor, the operator is able to apply more or less fertilizer as the ground may require, when the machine is in operation, due to the unique features of the variable speed.

It has long been the need of farmers to be able to apply fertilizer in different ratios on certain areas in the same field. For example, less fertilizer is required on low ground than is required on hills and other areas which are deficient in fertilizer. The present system of application is by manual control which requires a laborious setting for each field without any changes ever being made while the machinery is in operation.

Another object of the invention is to provide a fertilizer attachment in which the design of the fertilizer box is such that the fertilizer material flows parallel to the flight or conveyor mechanism and the mechanism pulls the fertilizer toward the feed cups of the box. Uniformity of the feed in the box is given by unique impellers. In my attachment a radial adjuster in the box around the conveyor screw has an adjustable radial control which also aids control of flow of the fertilizer in the box as some fertilizers such as potash have been found very difficult to apply. In my attachment the baffle and radial adjuster keep the weight of the fertilizer from the moving parts such as the conveyor screw.

A further object of the invention is to provide a warning light activated by a small generator allowing the operator of the tractor to determine from his position on the tractor if the fertilizer attachment and he drills are operating correctly as the light remains illuminated as long as the mechanism is operating.

I will explain the invention with reference to the accompanying drawings which illustrate several practical embodiments thereof, to enable others familiar with the art to adopt and use the same; and will summarize in the claims the novel features of construction, and novel combinations of parts, for which protection is desired.

Figure 1:
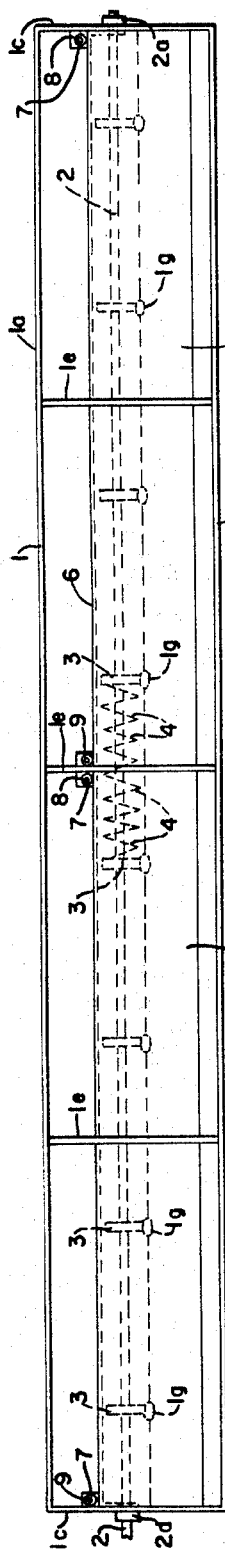
Figure 2:
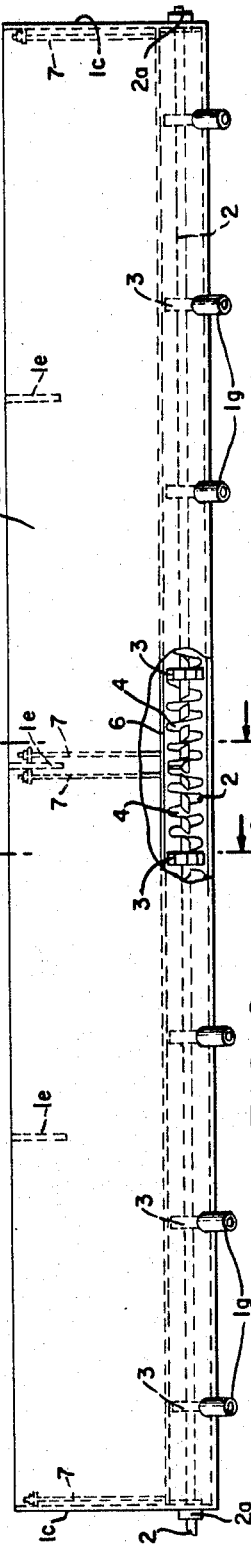
Figure 4:
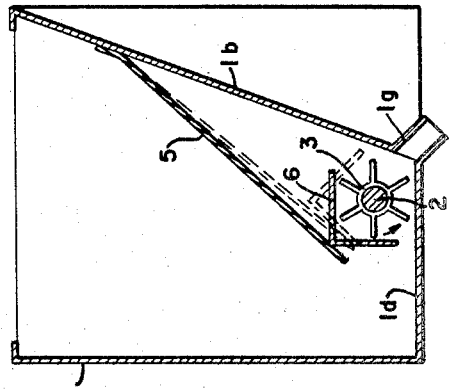
Figure 3:
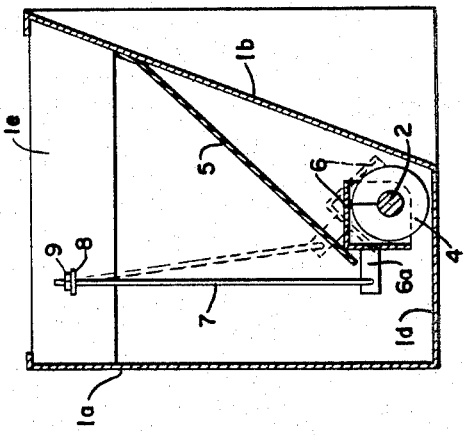
Figure 5:
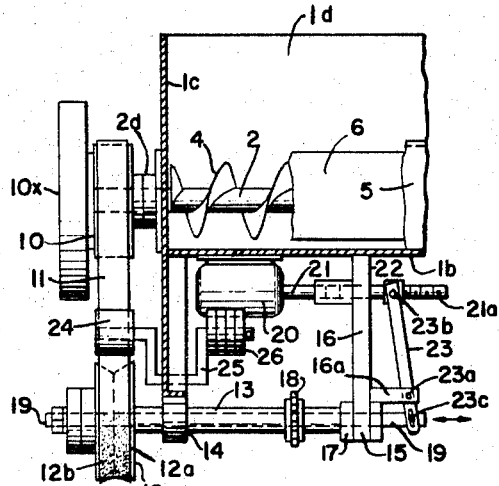
Figure 6:
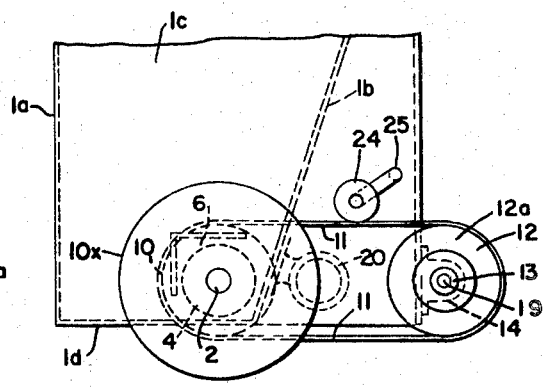
Figure 7:
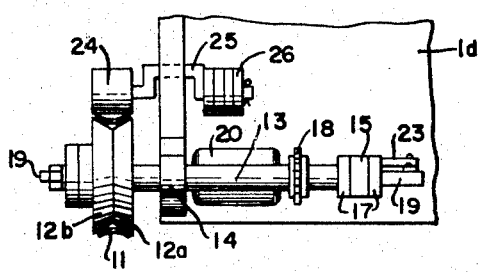
Figure 8:
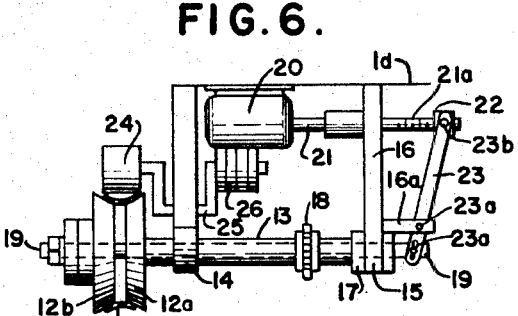
Figure 9:
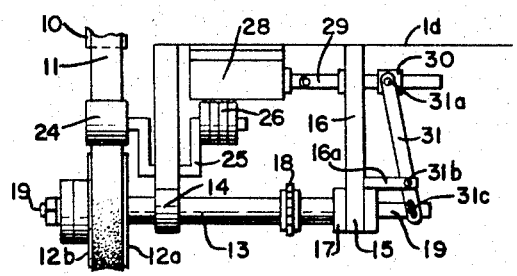
Figure 10:
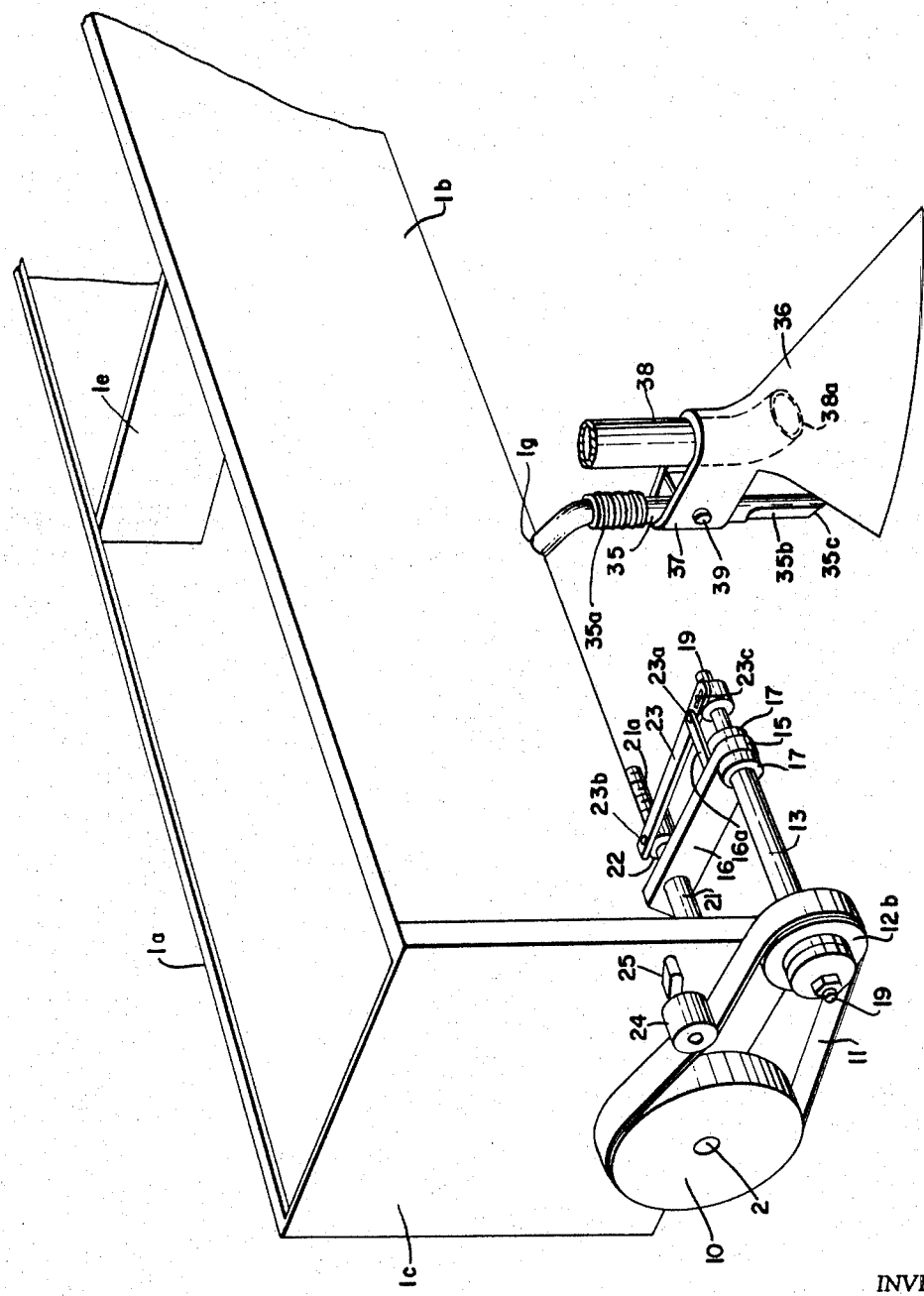
Figure 11:
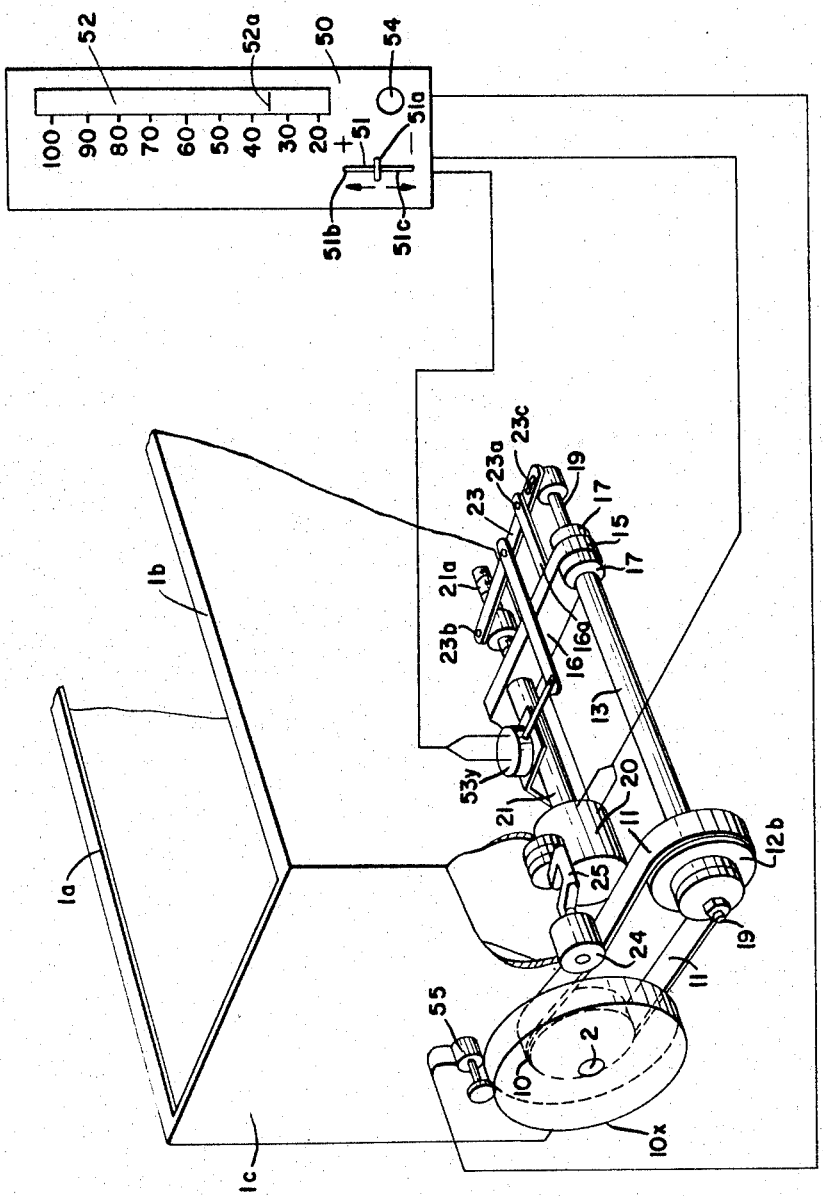
Figure 12:
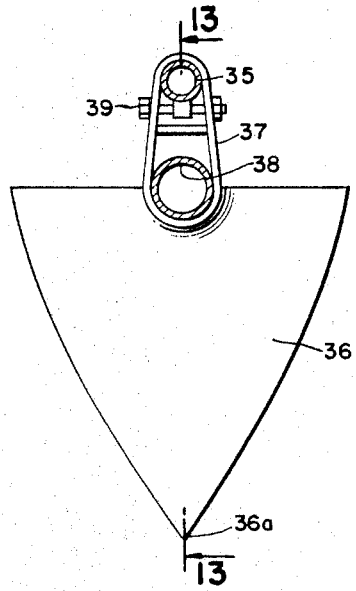
Figure 13:
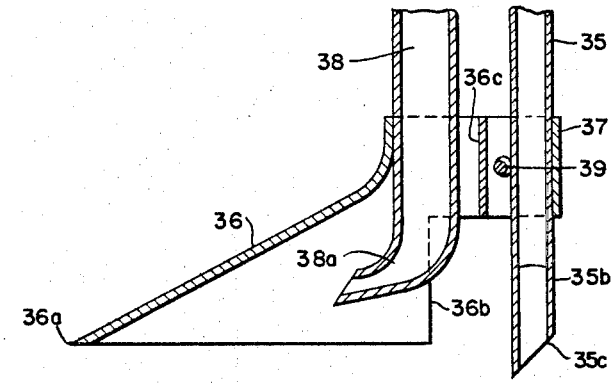
Figure 14:
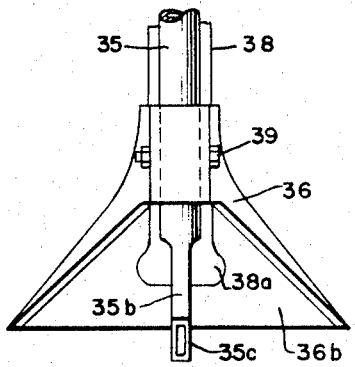
Figure 15:
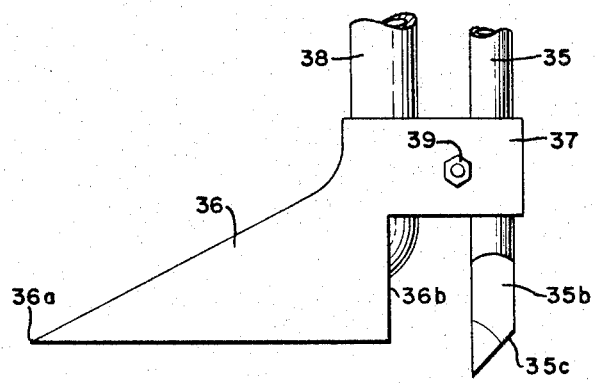

In said drawings:
FIG. 1 is a top plan view of the fertilizer box.
FIG. 2 is a rear elevational view thereof, partly broken away.
FIG. 3 is an enlarged transverse section on the line 3—3, FIG. 2.
FIG. 4 is an enlarged transverse section on the line 4—4, FIG. 2.
FIG. 5 is a partial longitudinal horizontal section through the drive end of the fertilizer box showing the parts in position to bring the halves of the split drive pulley together.
FIG. 6 is an end elevation of the drive end of the fertilizer box shown in FIG. 5.
FIG. 7 is a side view of the parts shown in FIG. 5.
FIG. 8 is a partial view similar to FIG. 5 but showing the parts in position to separate the halves of the split drive pulley.
FIG. 9 is a view similar to FIG. 5 but showing a modified form of the mechanism for moving the halves of the split drive pulley.
FIG. 10 is a perspective view of the drive-end of the fertilizer box showing the drive for the conveyor screws or auger, and also showing one of the fertilizer boots.
FIG. 11 is a view similar to FIG. 10 but indicating the means for varying the rate of feed of the fertilizer from a switch adapted to be mounted on the towing tractor adjacent the operator's seat.
FIG. 12 is a plan view of one of the fertilizer boots.
FIG. 13 is a vertical section on the line 13—13, FIG. 12.
FIG. 14 is a rear elevational view of the fertilizer boots shown in FIG. 13.
FIG. 15 is a side elevational view of the fertilizer boot shown in FIG. 14.

As shown in the drawings, the fertilizer box is elongated and of substantial rectangular cross-section, the same being adapted to be mounted on a grain drill, the box 1 having a front face 1b, a rear face 1a, and end plates 1c, at each end thereof, the front face 1b slanting inwardly and downwardly as clearly shown in FIGS. 3 and 4. A bottom plate 1d connects the lower end of the front face 1b with the lower end of the rear face 1a. At intervals throughout the length of the feed box cross-members 1e are provided connecting the tops of the front and rear face plates 1b and 1a to add rigidity to the sides of the fertilizer box. The fertilizer box may be made of metal or of plastic material. If made of metal the parts of the box may be coated with a wear-resistant compound which also eliminates build-up of the fertilizer on the metal; while if made of plastic the same may be molded directly from fibre glass so as to resist acid and also build-up of fertilizer.

Extending from the bottom of the front plate 1b are a series of evenly spaced fertilizer outlets 1g, eight being shown or indicated in FIGS. 1 and 2, evenly spaced apart, the two outermost outlets 1g being spaced from the end wall 1c of the fertilizer box a distance equal to half the spacing between adjacent outlets 1g, all the outlets 1g being directed forwardly and downwardly as shown in FIGS. 4 and 10.

Extending longitudinally of the fertilizer box 1 is a shaft 2 journaled in bearings 2a in the end walls 1c of the box, said shaft 2 being disposed adjacent to but spaced from the juncture of the bottom wall 1d and the front wall 1b of the box 1, as shown in FIGS. 3 and 4. Shaft 2 carries opposite each outlet 1g an impeller 3, FIGS. 2 and 4, provided with radial blades (six being shown) which revolve opposite the outlet 1g, the impeller being keyed to the shaft 2 so that when the shaft 2 is rotated in the direction of the arrow, FIG. 4, the fertilizer in the box 1 will be moved into the entrance of the outlets 1g.

On the shaft 2 between adjacent outlets 1g are keyed conveyor flights 4 (FIGS. 2 and 3) the flights 4 at opposite sides of each outlet being pitched in opposite directions so that the respective flights at opposite sides of the outlet move the fertilizer in the box 1 toward its respective outlet 1g. In FIG. 2 the flight sections 4 are clearly shown extending in opposite directions, each section being equal to half the distance between adjacent outlets 1g, and each flight section cooperating with a flight section at the opposite side of the respective outlet so that the fertilizer in the box will be moved by the respective flights 4 for each outlet 1g in opposite directions towards the related outlet 1g.

Extending inwardly and downwardly of the box 1 are a pair of aligned baffle plates 5 having their upper ends hingedly connected to the front face 1b of the box 1 as clearly shown in FIGS. 3 and 4 so that its lower end may be deflected from the full-line position shown in FIG. 4 to the dotted-line position shown in FIG. 4, the lower ends of baffles 5 being spaced above the bottom 1d of the box and terminating between the shaft 2 and the rear wall 1a of the box 1. The lower ends of the baffles 5 contact by gravity and by weight of the fertilizer in the fertilizer box above the baffles a baffle adjusting member comprising an angle iron 6 which has arms (not shown) pivoted on the shaft 2 so that the iron 6 may be rotated around the shaft 2 from the position shown in full lines in FIGS. 3 and 4, into the position shown in dotted lines in said figures. Thus, the lower ends of the baffles 5 will at all times contact either the heel of the angle iron 6, as shown in full lines in FIG. 4, or will contact one of the legs of the angle iron 6, as shown in dotted lines in said figure, thereby adjusting the baffle plates 5 from the full-line position shown in FIG. 4 to the dotted-line position thereof.

In order to rotate the angle iron 6 legs 6a (FIG. 3) are provided thereon extending inwardly of the box 1 beyond the lower end of the baffle plates 5, as shown in FIG. 3, and the outer ends of the leg 6a are connected to rods 7 extending upwardly within the fertilizer box 1 adjacent the outer ends thereof and adjacent the center cross-member 1e, the upper ends of rods 7 passing through eyes 8, FIG. 3, and carrying above the eyes nuts 9 on the threaded upper ends of the rods 7, whereby adjustment of the nuts 9 will cause the angle iron 6 to rotate about the shaft 2 and correspondingly adjust the angularity of the baffle plates 5, each of which extends one-half the overall length of the fertilizer box.

By the above construction the rods 7 and the angularity of the radial adjuster iron 6 can be adjusted to compensate for any kind of fertilizer, and the design of the box is such that the material flows parallel to the shaft 2, and conveyor flights 4 pulling the fertilizer towards the outlets 1g at each side thereof, uniformity of feed being given by the unique placement of the impellers 3. The radial adjuster iron 6 has an adjustable control (rods 7) which also aids control of flow as some fertilizers, such as potash, have been very difficult to apply, and the radial adjuster bar 6 can be adjusted to compensate for any kind of fertilizer, the baffles 5 and the angle iron 6 keeping the weight of the fertilizer in the box 1 from the moving parts. By the above construction the angle iron 6 can be positioned for even feed of fertilizer having different flow characteristics. The conveyor flights 4 pull the fertilizer to the impellers 3 giving constant and even feed through the outlet tubes 1g. Although the area within the box 1 below the baffles 5 is in fact a part of the hopper or fertilizer box, the fertilizer never in fact fills this area directly below the baffle, the box being compartmentalized by use of the baffles 5 and the radial adjuster irons 7. As a result the weight of the fertilizer never rests directly on the feed mechanism, and as a further result the fertilizer is not fed directly into the feed mechanism but rather it is pulled into the bottom area of the feed mechanism by the auger flightings 4 and dispensed by the impellers 3, thus preventing undesirable compaction of fertilizer in the area of the feed mechanism 2–6. The impellers 3 on the shaft 2 accomplishes uniform dispensing of the fertilizer in the box through the respective outlets 1g. The radial adjuster iron 6 runs the full length of and is a part of the feed mechanism. The pivot point on the radial adjuster is the feed shaft 2 and when rotated, the quantity of fertilizer dispensed can be controlled by allowing more or less fertilizer to enter the area of the feed mechanism.

As shown in FIGS. 5–8, one end of shaft 2 beyond its bearing 2d in the end wall 1c of the fertilizer box carries a pulley 10 around which runs a belt 11, FIGS. 5 and 6, the belt also running over a split drive pulley 12 having a fixed half 12a and an axially movable half 12b, the drive pulley 12 being disposed opposite the spring-loaded variable speed pulley 10 as shown in FIG. 5. The fixed half 12a of the split pulley 12 is mounted on a tubular shaft 13 which is disposed parallel with the shaft 2 and which is journaled in a bearing 14 which is attached to the rear end of the adjacent end wall 1c of the feed box, its other end being journaled in a bearing 15 which is carried by a strut 16 extending forwardly of the fertilizer box, collars 17 on the hollow shaft 3 at opposite sides of the bearing 15 preventing the hollow shaft 13 from movement in an axial direction while permitting rotation thereof. The drive for the hollow shaft 13 includes a chain sprocket 18 keyed onto said hollow shaft and driven by a chain, not shown, from a drive on the grain seeder or drill or driven by one of the ground wheels of the drill so that the speed of rotation of the hollow shaft 13 will at all times be proportional to the movement of the drill over the surface of the ground.

Within the hollow shaft 13 is rotatably mounted a solid shaft 19 to which the movable half of the split drive pulley 12 is fixedly attached, the shaft 19 being axially movable within the hollow shaft 13 so that the halves of the drive pulley may be brought into contact with each other, as shown in FIGS. 5 and 7, or the halves may be separated a certain extent as shown in FIG. 8 to alter the speed of the pulley 10 which drives the shaft 2, this adjustment being permissible while the drill is in motion, i.e., being drawn across the ground surface and while the seed drill is in operation.

FIGS. 5–8 show an electrical means for varying the speed of the shaft by causing separation of the halves 12a–12b of the split drive pulley. In these figures an electric motor 20 is shown bolted to the front face of the front wall 1b intermediate the length of the shaft 13, said motor 20 having a shaft 21 which is threaded as at 21a adjacent its outer end, and a nut 22 is threaded on the threaded end 21a, as shown in FIGS. 5 and 8. A lever 23 is pivoted as at 23a on a bracket 16a, said lever having one end pivoted as at 23b to the nut 22, and its other end having a slot and pin connection 23c, as shown in FIGS. 5 and 8, to the inner end of the shaft 19 which carries the movable half 12b of the split pulley 12, whereby when the motor 20 is actuated, as hereinafter explained, while the apparatus is in motion or at a standstill, the nut 22 will be moved outwardly of the motor shaft 21 from the position shown in FIG. 5 into the position shown in FIG. 8 and the lever 23 will correspondingly shift the shaft 19 which carries the movable half of the split pulley to separate the halves as shown in FIG. 8, thereby reducing the effective diameter of the split pulley 12 causing the shaft 2 in the fertilizer box to be rotated at somewhat lower speed than when the halves of the split pulley 12 are closed together.

In order to keep the tension on the belt 11 constant notwithstanding the amount of separation of the halves of the split pulley 12, I provide a tensioning wheel 24 mounted on a crank shaft 25, the crank shaft carrying a plurality of weights 26 adapted to urge the wheel 24 into constant engagement with the belt 11 in any adjustment of the opening between the split halves 12a–12b of the drive pulley 12.

FIG. 9 shows a modification of the means for adjusting the split pulley. In this modification instead of using the electric motor 20 for rotating the shaft 21, I utilize a hydraulic cylinder 28 actuating a piston rod 29 which has a guide in the strut 16 and is therefore axially movable through the hole therefor in the strut 16. The outer end of the piston rod 29 carries a head 30 which is pivoted as at 31a to a lever 31, which lever is pivoted as at 31b on the arm 16a extending from the strut 16, as in FIG. 5, the opposite end of the lever 31 having a pin and slot connection 31c to the inner end of the slidable shaft 19 which carries the fixed half 12a of the split pulley 12. In this manner, when the cylinder 28 is activated, the halves of the split pulley may be brought together or separated any desired amount.

FIG. 11 shows the relationship between the variable speed mechanism, above referred to, and a console box 50 which may be mounted on the towing tractor or vehicle near the operator seat. The variable speed is controlled by manually operating a three-position switch 51 on the console box. The middle position 51a on the three-position switch 3 indicates the off-position. The upper or plus position 51b activates the variable speed mechanism so that more fertilizer is applied. The lower or minus position 51c activates the variable speed mechanism so that less fertilizer is applied. The gauge or vertical indicator 52 on the console box is calibrated to show the pounds of fertilizer per acre that is being applied.

After activating the variable speed by use of the plus or minus three-position switch 51, the switch is returned to the "off" position when the desired volume of application of fertilizer is indicated by needle 52a on the gauge or vertical indicator. When switched to the "off" position the volume of application will remain at the selected volume until the switch is again reactivated.

A transducer 53y (FIG. 11) located on the variable speed mechanism, sends electric currents to the console box 50. A greater current is transmitted to vertical indicator 52 on the console box when split pulley 12 is closed and the belt 11 has been pulled down onto variable speed pulley 10. When the pulleys are in this position, the greatest amount of fertilizer is being applied. In other words, by use of the transducer 53y, the position of the variable speed pulleys is converted into pounds per acre being applied on the vertical indicator 52 on the control box 50.

The transducer 53y is preferably mounted on the linkage of the adjusting arm 23 as shown in FIG. 11. The console 50 is mounted near the operator's seat or station so that the rate of fertilizer application can be changed while the implement is in operation.

In operation, the motor 20 when activated from switch 51 on the console box 50, operates the screw mechanism which consists of threaded bolt 21a which moves forth or back through the nut 22, moving lever 23, which is fastened to shaft 19, which in turn opens and closes pulley half 12b. The movement of pulley half 12b is recorded by the movement of transducer 53y, which is activated by the lever 23 which adjusts the solid shaft 19. The transducer which indicates more or less voltage depending on which way the fields are rotated by the said lever and screw mechanism is in direct relationship to the vertical gauge 52 in console box 50.

The motor 20 is wired, so it is fully reversible to run clockwise or counterclockwise. This is for the purpose of having the transducer shaft, which rotates the fields in the transducer case which is in a fixed position, connected by a circuit to the vertical gauge 52 in the console box 50. The reading on the vertical gauge is in direct relationship to material being dispensed.

The console box houses the vertical gauge 52 and the three position switch 51. When the button is put in the 51b position it activates the motor 20 which closes pulley 12b. This results in an increase in fertilizer by increasing the speed of the fed mechanism. When this three position switch is put in the 51c position it opens pulley 12b resulting in a slowing of feed mechanism and as a result a lesser flow of material.

The console box 50 also houses the warning light 54 which receives its current from small generator 55 which is turned by the rotation of feed mechanism. If the mechanism fails to turn the warning light goes out, thereby indicating material is no longer being dispensed. The console box 50 is mounted on the towing unit by the operation's station so it can be observed and controlled by the operator at all times while the machine is in motion.

FIG. 11 also shows a warning light 54 and the generator 55 as it relates to the console box. When the feed mechanism is operating or turning, the small friction-driven generator 55 supplies current to the light 54 in the console box. The friction-driven generator 55 is driven off of an extension 10x (FIG. 11) of the variable speed pulley 10. This is to keep the operator informed whether or not the feed mechanism is in operation. In the event the pulley belt 11 breaks, or the ground drive mechanism fails, or if the feed mechanism is obstructed, the warning light 54 in the console box would be extinguished.

By the above construction I have provided a mechanism which is unique in that it provides a method of changing the flow of fertilizer from the operator's position on the tractor by an electric switch 51 while the machine is in motion. When the motor 20 is activated from the tractor, in desiring more or less application of fertilizer, it turns the adjusting screw 21 moving the adjusting arm 23 which in turn moves the adjusting shaft 19, which carries the movable half 12b of the split pulley 12. As this half 12b of the pulley moves in or out, the belt tightener 24 activated by the weights 26 maintains a proper tension on the drive belt 11. As the variable speed pulley 12 is activated and the belt tightener bracket 25 is moved to various positions, the electric transducer 53y indicates the change of speed of the drive belt 11. The gauge or vertical indicator 52 on the console box indicates the pounds-per-acre when properly calibrated.

As shown in FIGS. 10 and 12–15, fertilizer depth controls are used in connection with the fertilizer box 1. As indicated in FIG. 10 below and opposite each of the fertilizer outlets 1g is a fertilizer feed boot 35 comprising a hollow tube connected by a flexible hose 35a to the outer end of its related outlet 1g as shown in FIG. 10. Each fertilizer feed boot 35 extends vertically downwardly of the box 1 terminating at a depth below the ground level and below the seed bed so as to create a furrow for the fertilizer. As shown, the lower end portion of the fertilizer boot 35 is flattened as at 35b and the lower tip thereof is beveled as it 35c, the point of the tip thereof being hardened, if desired, the flattening 35b of the lower end of the fertilizer boot preventing plugging of dirt and the hardening 35c gives additional wearing ability.

In front of each fertilizer boot 35 is a drill shoe 36 which is of substantial triangular plan as shown in FIGS. 10 and 12, the surface of which is substantially V-shaped in cross-section as shown in FIG. 14, and from the front end or tip 36a thereof the shoe 36 extends upwardly and rearwardly and terminates in a substantially elliptical ring 37 formed integrally with the shoe 36. The sides of the shoe slope outwardly and downwardly and terminate somewhat above the lower end of fertilizer boot 35 as indicated in FIG. 13. As shown, the elliptical ring 37 extends rearwardly of the shoe at the center thereof and the shoe is open at the rear end 36b thereof.

Extending downwardly through the ring 37 at the front end thereof is a grain boot 38 connected at its upper end to the grain box (not shown) of the drain drill to which the fertilizer box 1 may be attached when fertilizer is to be applied with the seed. The lower end of the grain boot 38 is curved forwardly as at 38a and preferably flattened as shown in FIG. 13 so that the grain dropping through the boot 38 will be deposited below the shoe 36 and into the furrow formed by the shoe 36 in advance of the fertilizer boot 35. By this construction the drill shoe 36 is located in advance of the fertilizer boot 35. The tip of the shoe makes a furrow in the ground for receiving the grain seed from grain boot 38 and the fertilizer boot 35 follows behind in the same furrow making a deeper trench for the deposite of fertilizer below the grain seed.

As shown, the fertilizer boot 35 is adjustably mounted on ring 37 which engages the rear end of the elliptical ring 37, as shown on FIGS. 12, 13 and 15 in rear of an integral cross-brace 36c, FIG. 13; and a cam bolt 39 passes through registering perforations in the sides of the ring 37 and engages the fertilizer boot 35, whereby the fertilizer boot 35 may be adjusted vertically on the ring 37 to any desired position.

This attachment can be used as an attachment to a basic non-compacting fertilizer attachment when below-the-surface fertilizering is desired. The fertilizer depth control attachment shown in FIGS. 12–13 is not to be confused with the grain seed boot which is attached to the customary drain drill on which the basic fertilizer attachment is mounted.

I do not limit my invention to the exact forms shown in the drawings.

I claim:

1. A fertilizer attachment for grain seeders or the like comprisnig a fertilizer box having front and rear walls, end walls, and a bottom wall, and having spaced discharge spouts extending from the juncture of the bottom wall and front wall; a shaft journaled in the box adjacent and spaced from said juncture; sets of opposed conveyor flights on said shaft for the respective spouts extending from points adjacent the spouts to points midway of adjacent spouts for directing fertilizer at each side of the spouts towards their respective spouts; impellers on said shaft opposite the respective spouts for directing said fertilizer into said spouts; an angle iron extending the length of the box and journaled on said shaft, said angle iron having its horizontal leg normally overlying the tops of the flights and its vertical leg spaced from the flights and disposed normally at the side of the flights opposite from the spouts; means for adjustably maintaining the angle iron in any desired radial position; inwardly and downwardly inclined baffle plates in the box coextensive with the angle iron and hingedly connected at their upper ends to the front wall, the lower ends of the baffle plates seating upon said angle iron and terminating above the bottom wall thereby protecting the conveyor flights and angle iron from the full weight of the fertilizer in the box while permitting adjustment to compensate for use of different kinds of fertilizer; means for rotating the shaft proportionally to the movement of the seeder over the ground surface; and means for varying the speed of rotation of the shaft while the seeder is in motion.

2. In an attachment as set forth in claim 1, said front wall of the box being inclined forwardly and downwardly towards the rear wall.

3. In an attachment as set forth in claim 1, said means for rotating the shaft comprising a hollow shaft journaled on the box parallel with the first shaft; a sprocket on said hollow shaft adapted to be driven by and with the grain seeder; a pulley on the first shaft exteriorly of the box; a driven second pulley on the hollow shaft aligned with the first pulley; and a belt running around said pulleys.

4. In an attachment as set forth in claim 3, said second pulley being split, the fixed half thereof being carried by the hollow shaft; a solid shaft axially movable within and journaled in the hollow shaft and carrying the movable half of the split pulley; means for shifting the solid shaft to shift the movable half of the split pulley with respect to the fixed half; and a weighted belt tightener roll on a crank shaft journaled on the box and engaging the belt to maintain same taut.

5. In an attachment as set forth in claim 4, said means for shifting the solid shaft comprising an electric motor mounted on the front wall and having a shaft disposed parallel with the solid shaft, said motor shaft having a threaded portion; a nut on said threaded portion; a lever pivoted on said box having one end pivotally connected to said nut and the other end pivotally connected to said solid shaft.

6. In an attachment as set forth in claim 4, said means for shifting the solid shaft comprising an hydraulic cylinder mounted on the front wall and having a piston disposed parallel with the solid shaft; said piston having a head thereon; a lever pivoted on said box having one end pivotally connected to said head and the other end pivotally connected to said solid shaft.

7. In an attachment as set forth in claim 5, an electrical circuit including a console box adapted to be mounted on a towing vehicle adjacent the driver's seat, said console box having a three-position switch in said circuit; a transducer in said circuit located on the said lever which adjusts the solid shaft; and a friction-drive generator in said circuit driven by the pulley on said first shaft.

8. In an attachment as set forth in claim 1, fertilizer boots extending downwardly of the box adjacent to and connected with their related discharge spouts, said boots being adjustable and adapted to form furrows in the ground surface; grain shoes mounted on and in advance of each fertilizer boot adapted to make shallow furrows for the seed in the ground surface; and grain boots extending downwardly through the shoes for directing grain seed forwardly under each shoe.

9. In an attachment as set forth in calim 8, each shoe being substantially triangular in plan and of substantially V-shape in cross-section, the top of the shoe extending upwardly and rearwardly from the tip at the front end and terminating in a substantially elliptical ring receiving the related grain boot and the fertilizer boot at opposite ends thereof; the rear end of the shoe being open.

References Cited

UNITED STATES PATENTS 2,355,728   8/1944   Hyland _____ 222—272 X
2,819,826   1/1958   Kirschmann _____ 222—272

ABRAHAM G. STONE, *Primary Examiner.*
STEPHEN C. PELLEGRINO, *Assistant Examiner.*

U.S. Cl. X.R.

111—80; 222—272, 317